United States Patent

Jeon et al.

(10) Patent No.: US 11,310,415 B2
(45) Date of Patent: Apr. 19, 2022

(54) SYSTEM HAVING CAMERA APPLICATION COMPRISING MULTIPLE CAMERA PACKAGES AND CONTROL METHOD THEREOF (71) Applicant: Snow Corporation, Seongnam-si (KR)

(72) Inventors: SangCheol Jeon, Seongnam-si (KR); Sam-Yeol Lim, Seongnam-si (KR); Jihun Jeong, Seongnam-si (KR)

(73) Assignee: Snow Corporation, Gyeonggi-do (KR)

( * ) Notice: Subject to any disclaimer, the term of this patent is extended or adjusted under 35 U.S.C. 154(b) by 252 days.

(21) Appl. No.: 16/657,207

(22) Filed: Oct. 18, 2019

(65) Prior Publication Data

US 2020/0128175 A1 Apr. 23, 2020

(30) Foreign Application Priority Data

Oct. 19, 2018 (KR) .......................... 10-2018-0125342
Dec. 12, 2018 (KR) .......................... 10-2018-0159772

(51) Int. Cl.
*H04N 5/232* (2006.01)
(52) U.S. Cl.
CPC ..... *H04N 5/23225* (2013.01); *H04N 5/23245* (2013.01); *H04N 5/232933* (2018.08)
(58) Field of Classification Search
CPC .................................................. H04N 5/23225
USPC ........................................................ 348/207.1
See application file for complete search history.

(56) References Cited

U.S. PATENT DOCUMENTS

2016/0094679 A1* 3/2016 Lee .......................... H04L 67/06
709/219

FOREIGN PATENT DOCUMENTS

| JP | 2002-078957 A | 3/2002 |
| KR | 10-2007-0027175 A | 3/2007 |
| KR | 10-2016-0037019 A | 4/2016 |
| KR | 10-2017-0138800 A | 12/2017 |

OTHER PUBLICATIONS

Office Action for Japanese Patent Application No. 2019-166064 dated Oct. 27, 2020.
Office Action for Korean Patent Application No. 10-2018-0159772 dated Nov. 25, 2019.

* cited by examiner

*Primary Examiner* — Joel W Fosselman
(74) *Attorney, Agent, or Firm* — Harness, Dickey & Pierce, P.L.C.

(57) ABSTRACT

A computer-implemented camera function control method of an electronic device includes receiving a user selection, the user selection corresponding to a camera function selected from a camera list which includes a plurality of camera functions of a camera application installed on the electronic device, the plurality of camera functions each being configured in a package form to be operable in an individual camera mode of the camera application; and constructing, using a package of the camera function corresponding to the user selection, a user interface for image capturing.

19 Claims, 8 Drawing Sheets

SYSTEM HAVING CAMERA APPLICATION COMPRISING MULTIPLE CAMERA PACKAGES AND CONTROL METHOD THEREOF

CROSS-REFERENCE TO RELATED APPLICATION(S)

This U.S. non-provisional application claims the benefit of priority under 35 U.S.C. § 119 to Korean Patent Application No. 10-2018-0125342 filed on Oct. 19, 2018, and Korean Patent Application No. 10-2018-0159772 filed on Dec. 12, 2018, in the Korean Intellectual Property Office (KIPO), the entire contents of each of which are incorporated herein by reference.

BACKGROUND

Field

One or more example embodiments relate to technology for providing a camera function.

Description of Related Art

Among various functions of a portable terminal, such as a smartphone or a tablet, particularly, a camera function enables a user of the portable terminal to take a photo, in a manner like that of a digital camera. Accordingly, as one of highly useful additional functions, the development of various camera related applications is actively ongoing.

As an example of camera related technology, technology for composing photos stored in a mobile terminal or photos captured with a camera mounted to the mobile terminal using a background color in the mobile terminal is disclosed in Korean Patent Laid-Open Publication No. 10-2007-0027175, published on Mar. 9, 2007.

SUMMARY

Example embodiments provide technology for using various camera modes in a single app through a camera application including a plurality of camera packages.

Example embodiments also provide technology for providing a camera application in which a plurality of camera packages uses a common engine within a single app.

Example embodiments also provide technology for additionally applying a plurality of camera functions to a single camera application through affiliation with partner companies.

According to at least some example embodiments, a computer-implemented camera function control method of an electronic device includes receiving a user selection, the user selection corresponding to a camera function selected from a camera list which includes a plurality of camera functions of a camera application installed on the electronic device, the plurality of camera functions each being configured in a package form to be operable in an individual camera mode of the camera application; and constructing, using a package of the camera function corresponding to the user selection, a user interface for image capturing.

The plurality of camera functions may use a common engine in the camera application for rendering and layout.

Each of the plurality of camera functions included in the camera application may be configured in a package form including a capturing interface configurable in an individual camera mode.

A package element of each of the plurality of camera functions included in the camera application may include image and location information for each interface of a corresponding camera function and function metadata for each interface.

The camera function control method may further include providing the camera list by including the camera list in a menu list of an image capturing related function as content included in the camera application.

The constructing may include constructing the user interface such that a capturing interface included in the package of the camera function corresponding to the user selection is overlapped on a camera image.

The constructing may include switching between camera functions such that a camera mode is changed in the camera application in response to the user selection.

The constructing may include including, in the user interface, a list of contents applicable to a camera image, the list of contents being included in the package of the camera function corresponding to the user selection.

The camera function control method may further include downloading in real time the package of the camera function corresponding to the user selection through a server associated with the camera application.

The camera function control method may further include automatically updating the downloaded package at a time of updating the camera application.

According to at least some example embodiments, a non-transitory computer-readable record medium stores instructions that, when executed by a processor, cause the processor to perform the camera function control method.

According to at least some example embodiments, a file distribution system includes memory storing computer-executable instructions; and a first processor configured to execute the computer-executable instructions such that the processor is configured to transmit a file of a camera application to an electronic device in response to a request from the electronic device, wherein the camera application includes program code corresponding to a plurality of camera functions and program code corresponding to a common engine, wherein the plurality of camera functions are each configured in a package form to implement an individual camera mode of the camera application, wherein the common engine is configured to implement rendering and layout functions of the camera application with respect to the individual camera modes of each of the plurality of camera functions, and wherein the camera application further includes program code for receiving a user selection, the user selection corresponding to a camera function from among a plurality of camera functions included in a camera list, and program code for constructing a user interface for image capturing using a package of the camera function corresponding to the user selection.

According to at least some example embodiments, a computer system includes a memory storing computer-executable instructions; and at least one processor configured to execute the computer-executable instructions, wherein a camera application comprising a plurality of camera functions each configured in a package form to be operable in an individual camera mode is installed in the computer system, and wherein the at least one processor is configured to execute the computer-executable instructions such that the at least one processor is configured to receive a user selection, the user selection corresponding to a camera function from among a plurality of camera functions included in a camera list, and construct a user interface for image capturing using a package of the camera function corresponding to the user selection in response to receiving the user selection.

The plurality of camera functions may use a common engine in the camera application for rendering and layout.

The plurality of camera functions included in the camera application may each configured in a package form including a capturing interface configurable in an individual camera mode.

The at least one processor may be further configured to execute the computer-executable instructions such that the at least one processor is configured to provide the camera list by including the camera list in a menu list of an image capturing related function as content included in the camera application.

The at least one processor may be further configured to execute the computer-executable instructions such that the at least one processor is configured to switch between camera functions such that a camera mode is changed in the camera application in response to the user selection.

The at least one processor may be further configured to execute the computer-executable instructions such that the at least one processor is configured to include, in the user interface, a list of contents applicable to a camera image, the list of contents being included in the package of the camera function corresponding to the user selection.

The at least one processor may be further configured to execute the computer-executable instructions such that the at least one processor is configured to download in real time the package of the camera function corresponding to the user selection through a server associated with the camera application.

The at least one processor may be further configured to execute the computer-executable instructions such that the at least one processor is configured to automatically update the downloaded package at a time of updating the camera application.

According to some example embodiments, it is possible to use various camera modes in a single app through a camera application including a plurality of camera packages.

According to some example embodiments, it is possible to provide a light camera application in which a plurality of camera packages uses a common engine within a single app.

According to some example embodiments, it is possible to additionally apply a plurality of camera functions to a single camera application through affiliation with partner companies.

Further areas of applicability will become apparent from the description provided herein. The description and specific examples in this summary are intended for purposes of illustration only and are not intended to limit the scope of the present disclosure.

BRIEF DESCRIPTION OF THE FIGURES

The above and other features and advantages of example embodiments of the inventive concepts will become more apparent by describing in detail example embodiments of the inventive concepts with reference to the attached drawings. The accompanying drawings are intended to depict example embodiments of the inventive concepts and should not be interpreted to limit the intended scope of the claims. The accompanying drawings are not to be considered as drawn to scale unless explicitly noted.

DETAILED DESCRIPTION

One or more example embodiments will be described in detail with reference to the accompanying drawings. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

As used herein, the singular forms "a," "an," and "the," are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups, thereof. As used herein, the term "and/or" includes any and all combinations of one or more of the associated listed products. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

Unless otherwise defined, all terms (including technical and scientific terms) used herein have the same meaning as commonly understood by one of ordinary skill in the art to which example embodiments belong. Terms, such as those defined in commonly used dictionaries, should be interpreted as having a meaning that is consistent with their meaning in the context of the relevant art and/or this disclosure, and should not be interpreted in an idealized or overly formal sense unless expressly so defined herein.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particular manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

Units and/or devices according to one or more example embodiments may be implemented using hardware and/or a combination of hardware and software. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor), Central Processing Unit (CPU), a controller, an arithmetic logic unit (ALU), a digital signal processor, a microcomputer, a microprocessor, etc., the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer record medium or device, capable of providing instructions or data to, or being interpreted by, a hardware device. The software also may be distributed over network coupled computer systems so that the software is stored and executed in a distributed fashion. In particular, for example, software and data may be stored by one or more computer readable record mediums, including the tangible or non-transitory computer-readable record media discussed herein.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable record media, such as random access memory (RAM), read only memory (ROM), a permanent mass storage device (such as a disk drive, solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable record medium into the one or more storage devices and/or one or more computer processing devices using a drive mechanism. Such separate computer readable record medium may include a Universal Serial Bus (USB) flash drive, a memory stick, a Blue-ray/DVD/CD-ROM drive, a memory card, and/or other like computer readable record media. The computer programs, program code, instructions, or some combination thereof, may be loaded into the one or more storage devices and/or the one or more computer processing devices from a remote data storage device via a network interface, rather than via a local computer readable record medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as one computer processing device; however, one skilled in the art will appreciate that a hardware device may include multiple processing elements and multiple types of processing elements. For example, a hardware device may include multiple processors or a processor and a controller. In addition, other processing configurations are possible, such as parallel processors.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

Hereinafter, example embodiments will be described with reference to the accompanying drawings.

The example embodiments relate to a system including a camera application with a plurality of camera packages and a control method thereof.

The example embodiments including the detailed disclosures may provide a camera application including a plurality of camera packages and accordingly may achieve many advantages in terms of efficiency, compatibility, diversity, combinability, and cost saving.

Figure 1:
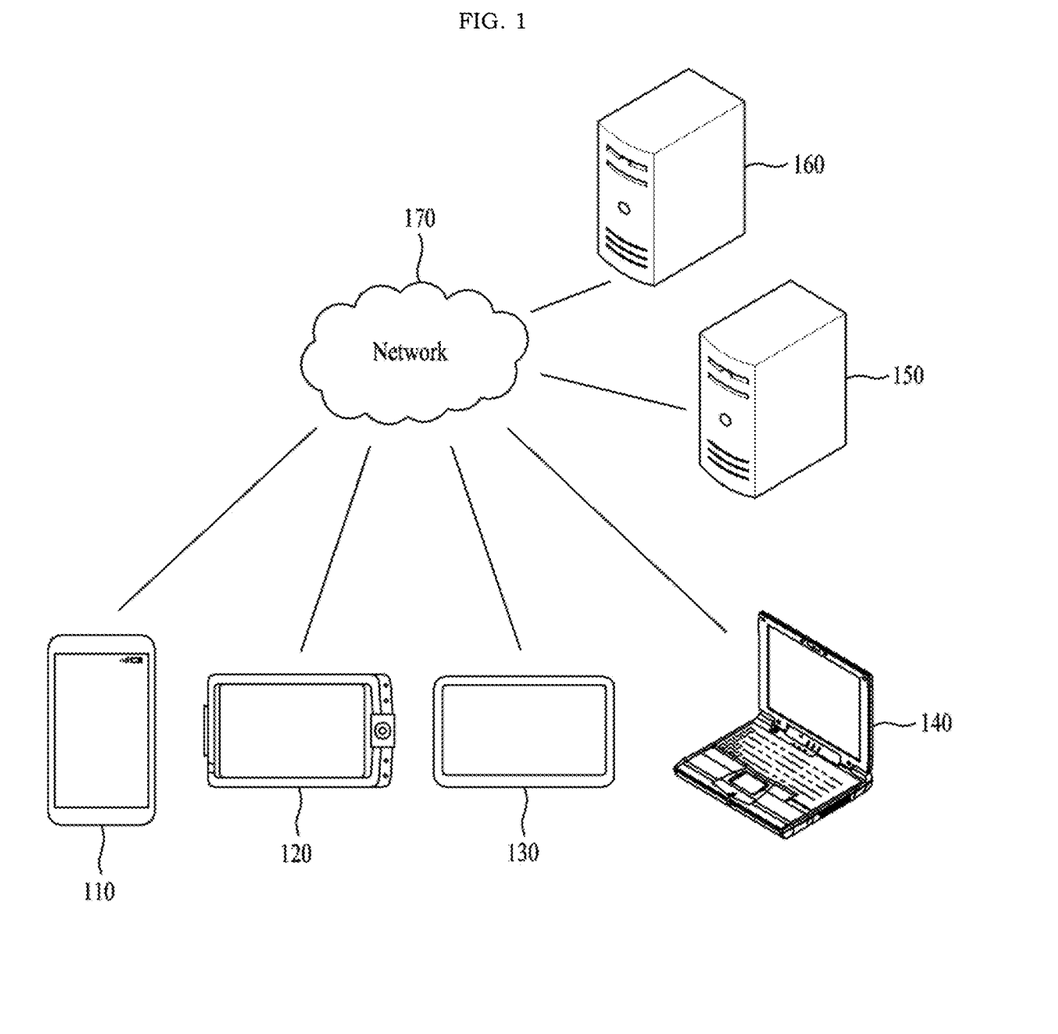
FIG. 1 illustrates an example of a network environment according to at least one example embodiment.

FIG. 1 is a diagram illustrating an example of a network environment according to at least one example embodiment. Referring to FIG. 1, the network environment includes a plurality of electronic devices 110, 120, 130, and 140, a plurality of servers 150 and 160, and a network 170. FIG. 1 is provided as an example only and thus, a number of electronic devices and/or a number of servers are not limited thereto.

Each of the plurality of electronic devices 110, 120, 130, and 140 may be a fixed terminal or a mobile terminal configured as a computer system. Examples of the types of devices which any or all of the plurality of electronic devices 110, 120, 130, and 140 may be embodied as include, but are not limited to, a smartphone, a mobile phone, a navigation device, a computer, a laptop computer, a digital broadcasting terminal, a personal digital assistant (PDA), a portable multimedia player (PMP), a tablet personal computer (PC), a game console, a wearable device, an Internet of things (IoT) device, a virtual reality (VR) device, and an augmented reality (AR) device. For example, although FIG. 1 illustrates a shape of a smartphone as an example of the electronic device 110, the electronic device 110 may refer to one of various physical computer systems capable of communicating with other electronic devices 120, 130, and 140, and/or the servers 150 and 160 over the network 170 in a wired communication manner or in a wireless communication manner.

The communication scheme is not particularly limited and may include a communication method using a near field communication between devices as well as a communication method using a communication network, for example, a mobile communication network, the wired Internet, the wireless Internet, a broadcasting network, and/or a satellite network, which may be included in the network 170. For example, the network 170 may include one or more of network topologies that include, for example, a personal area network (PAN), a local area network (LAN), a campus area network (CAN), a metropolitan area network (MAN), a wide area network (WAN), a broadband network (BBN), and the Internet. Also, the network 170 may include one or more of network topologies that include a bus network, a star network, a ring network, a mesh network, a star-bus network, a tree or hierarchical network, and the like. However, the communications schemes and network topologies discussed above are only examples, and at least some example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and 140 over the network 170. For example, the server 150 may be a system that provides a first service to the plurality of electronic devices 110, 120, 130, and/or 140 over the network 170, and the server 160 may be a system that provides a second service to the plurality of electronic devices 110, 120, 130, and/or 140 over the network 170. In detail, the server 150 may provide a service, for example, a camera function, desired by a corresponding application as the first service to any or all of the plurality of electronic devices 110, 120, 130, and/or 140 through the application, which may be installed and executed (e.g., as a computer program) on any or all of the plurality of electronic devices 110, 120, 130, and/or 140. As another example, the server 160 may provide a service for distributing a file for installing and executing the application to the plurality of electronic devices 110, 120, 130, and/or 140 as the second service. For example, the server 160 may include a file transmitter (not shown) configured to transmit the file in response to a request from the electronic device 110. According to at least some example embodiments, the server 160 includes memory storing computer-executable instructions; and a processor configured to execute the computer-executable instructions such that the processor is configured to transmit the file (e.g., a file of a camera application) to the electronic device 110. As used in the present disclosure, an "application" is software (e.g., a computer program), and may also be referred to on occasion as a "program" or "computer program."

Figure 2:
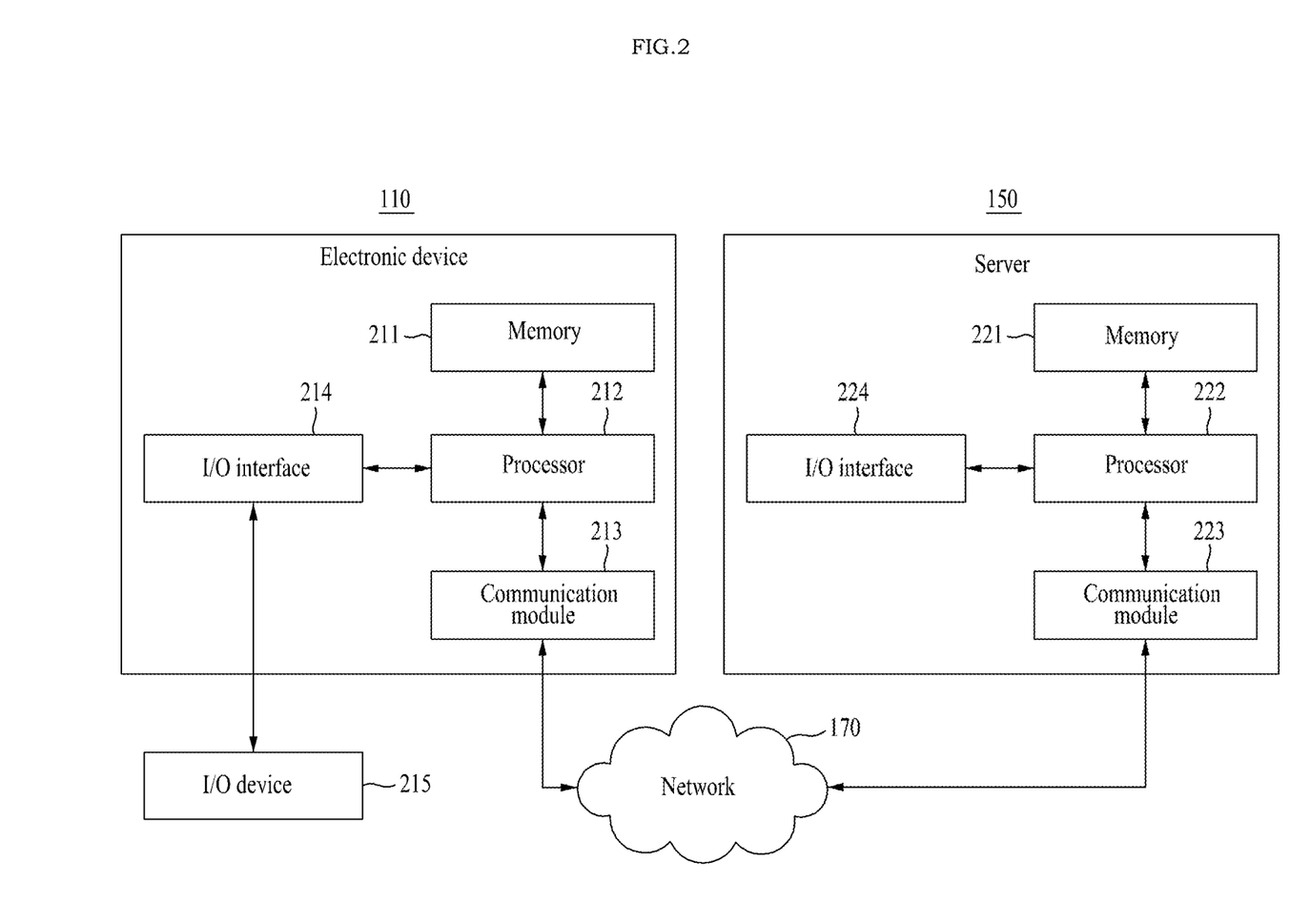
FIG. 2 illustrates an example of an electronic device and a server according to at least one example embodiment.

FIG. 2 is a block diagram illustrating an example of an electronic device and a server according to at least one example embodiment. FIG. 2 illustrates a configuration of the electronic device 110 as an example for a single electronic device and illustrates a configuration of the server 150 as an example for a single server. The same or similar components may be applicable to other electronic devices 120, 130, and/or 140, or the server 160, and also to still other electronic devices or still other servers.

Referring to FIG. 2, the electronic device 110 may include a memory 211, a processor 212, a communication module 213, and an input/output (I/O) interface 214, and the server 150 may include a memory 221, a processor 222, a communication module 223, and an I/O interface 224. For the purpose of simplicity, some descriptions that may apply, generally, to both of the memories 211 and 221, both of the processors 212 and 222, or both of the communication modules 213 and 233, will be described below, with reference to "the memory 211, 221," "the processor 212, 222," or "the communication module 213, 233." However, according to at least some example embodiments, the memory 211, processor 212 and communication module 213 are separate from, and may have structures that differ from, the memory 221, processor 222 and communication module 223, respectively.

The memory 211, 221 may include a permanent mass storage device, such as random access memory (RAM), a read only memory (ROM), a disk drive, a solid state drive (SSD), and a flash memory, as a non-transitory computer-readable record medium. The permanent mass storage device, such as ROM, SSD, a flash memory, and a disk drive, may be included in the electronic device 110 or the server 150 as a permanent storage device separate from the memory 211, 221. Also, an operating system (OS) or at least one program code, for example, a code for a browser installed and executed on the electronic device 110 or an application installed and executed on the electronic device 110 to provide a specific service, may be stored in the memory 211, 221. Such software components may be loaded from another non-transitory computer-readable record medium separate from the memory 211, 221. The other non-transitory computer-readable record medium may include a non-transitory computer-readable record medium, for example, a floppy drive, a disk, a tape, a DVD/CD-ROM drive, a memory card, etc. According to other example embodiments, software components may be loaded to the memory 211, 221 through the communication module 213, 223, instead of, or in addition to, the non-transitory computer-readable record medium. For example, at least one program may be loaded to the memory 211, 221 based on a computer program, for example, the application, installed based on files provided over the network 170 from developers or a file distribution system, for example, the server 160, which provides an installation file of the application.

According to at least some example embodiments, the processor 212, 222 is a hardware-implemented data processing device having circuitry that is physically structured to execute desired operations including, for example, operations represented as code and/or instructions included in a program. Examples of the above-referenced hardware-implemented data processing device include, but are not limited to, a microprocessor, a central processing unit (CPU), a processor core, a multi-core processor; a multiprocessor, an application-specific integrated circuit (ASIC), and a field programmable gate array (FPGA). Processors executing program code are programmed processors, and thus, are special-purpose computers. The processor 212, 222 may be configured to process computer-readable instructions (e.g., program code) of a computer program by performing basic arithmetic operations, logic operations, and I/O operations. The computer-readable instructions may be provided from the memory 211, 221 or the communication module 213, 223 to the processor 212, 222. For example, the processor 212, 222 may be configured to execute received instructions in response to the received instructions being stored in a storage device, such as the memory 211, 221.

The communication module 213, 223 may provide a function for communication between the electronic device 110 and the server 150 over the network 170, and may provide a function for communication with another electronic device, for example, the electronic device 120 or another server, for example, the server 160. For example, the processor 212 of the electronic device 110 may transfer a request created based on a program code stored in a storage device, such as the memory 211, to the server 150 over the network 170 under control of the communication module 213. Inversely, a control signal, an instruction, content, a file, etc., provided under control of the processor 222 of the server 150 may be received at the electronic device 110 through the communication module 213 of the electronic device 110 by going through the communication module 223 and the network 170. For example, a control signal, an instruction, content, a file, etc., of the server 150 received through the communication module 213 may be transferred to the processor 212 or the memory 211, and content, a file, etc., may be stored in a record medium, for example, the aforementioned permanent storage device, further includable in the electronic device 110.

The I/O interface 214 may be a device used for interface with an I/O device 215. For example, an input device may include a device, such as a keyboard, a mouse, a microphone, and a camera, and an output device may include a device, such as a display, a speaker, and a haptic feedback device. As another example, the I/O interface 214 may be a device for interface with an apparatus in which an input function and an output function are integrated into a single function, such as a touchscreen. The I/O device 215 may be configured as a single device with the electronic device 110. Also, the I/O interface 224 of the server 150 may be a device for interface with an apparatus (not shown) for input or output that may be connected to the server 150 or included in the server 150. In detail, when processing instructions of the computer program loaded to the memory 211, the processor 212 of the electronic device 110 may display a service screen configured using data provided from the server 150 or the electronic device 120, or may display content on a display through the I/O interface 214.

According to other example embodiments, the electronic device 110 and the server 150 may include a number of components greater or less than a number of components shown in FIG. 2. However, there is no need to clearly illustrate many components according to the related art. For example, the electronic device 110 may include at least a portion of the I/O device 215, or may further include other components, for example, a transceiver, a global positioning system (GPS) module, a camera, a variety of sensors, a database (DB), and the like. In detail, if the electronic device 110 is a smartphone, the electronic device 110 may be configured to further include a variety of components, for example, an accelerometer sensor, a gyro sensor, a camera module, various physical buttons, a button using a touch panel, an I/O port, a vibrator for vibration, etc., which are generally included in the smartphone.

Hereinafter, a system including a camera application with a plurality of camera packages and a control method thereof according to example embodiments will be described.

Figure 3:
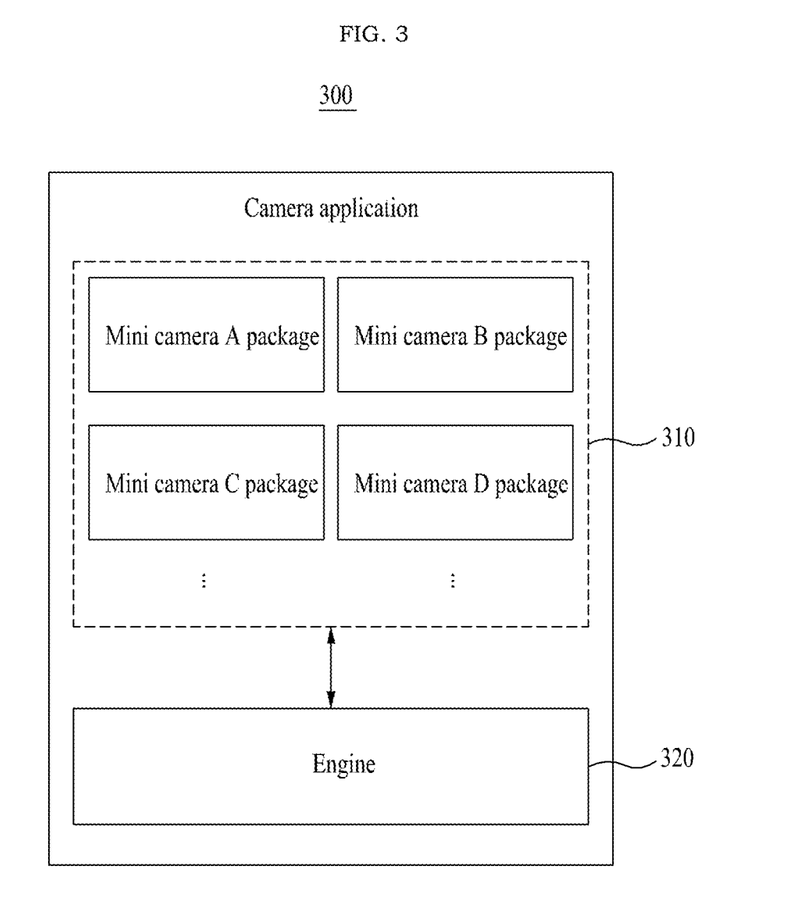
FIG. 3 illustrates an example of a configuration of a camera application including a plurality of camera packages according to at least one example embodiment.

FIG. 3 illustrates an example of a configuration of a camera application including a plurality of camera packages according to at least one example embodiment.

A camera application 300 may perform the functionality, for example, taking a photo, taking a video, and displaying a stored image, such as a photo or a video, as a function using a camera mounted to the electronic device 110.

The camera application 300 may select a desired camera mode from among various modes associated with capturing an image, for example, taking a photo and taking a video, for example based on user input received at the electronic device via a user interface provided by the camera application 300.

Referring to FIG. 3, the camera application 300 may include a plurality of camera functions 310, such as a camera in camera, subject within a single app. Camera functions 310 may also be referred to in the present disclosure as mini cameras 310.

Each mini camera 310 may be configured in a form of a package, for example, a camera package. The camera package of each mini camera 310 may include various capturing interfaces and/or capturing contents for providing, as an individual camera mode, a desired or, alternatively, predetermined concept of a camera function. Thus, according to at least some example embodiments, a camera package may refer to interface(s) and/or capturing contents that may be provided, together, by the electronic device 110 as an individual camera mode or camera function.

The capturing contents included in a camera package may refer to any type of contents applicable to a camera image, for example, various filters or effects, augmented reality (AR) contents, and/or acoustic effects.

Each mini camera 310 may be configured as a different concept of an individual camera function and may be provided as a type of content included in the camera application 300.

According to at least some example embodiments, each mini camera 310 may be configured as a camera package that includes an advertising-type interface or content.

For example, a mini camera A may refer to a camera function of an affiliate a and may construct a capturing interface or capturing content associated with the affiliate a as a camera package. A logo or a feature of the affiliate a may be displayed on the capturing interface or content applicable to a camera image may be produced as promotion content of the affiliate a.

That is, a camera mode of a corresponding affiliate company may be additionally applied in the camera application 300 through affiliation with a corresponding partner company.

A package element of the mini camera 310 may include, for example, image and location information for each interface and function metadata for each interface as a programmed code. According to at least some example embodiments, any or all the interfaces that are included in a package element (e.g., a camera package) of the mini camera 310 may be a user interface (e.g., a graphical user interface or an element thereof) associated with a camera function corresponding to the mini camera 310. According to at least some example embodiments, each user interface of the mini camera 310 may be associated with an interface action, and the function metadata of the mini camera 310 may be metadata associated with each interface action. Examples of a user interface of the mini camera 310 include, but are not limited to, a photo shooting button, a video shooting button, a timer setting button, a flash button, an effect button, a download button, etc.

The mini camera 310 may operate according to a desired or, alternatively, predetermined scenario in such a manner that an engine 320 of the camera application 300 reads a programmed code in a package in runtime.

An individual app may construct a separate engine for rendering or layout in performing a camera function. However, the mini camera 310 may commonly use the engine 320 of the camera application 300 instead of constructing a separate individual engine.

Although each mini camera 310 may provide a different capturing interface or content, an app itself of the camera application 300 using the engine 320 common within the camera application 300 may be constructed to be light.

Accordingly, each mini camera 310 may be configured as an individual function within the camera application 300 that is a single app, in a package form, instead of being present as an individual app. For example, instead of implementing five separate mini cameras 310 as five separate apps, respectively, the five separate mini cameras may be implemented as five camera packages, respectively, within a single app, the camera application 300. For example, according to at least some example embodiments, each camera package of each mini camera 310 corresponds to program code that is stored in storage (e.g., memory 211) and, when executed by the processor 212 in conjunction with program code corresponding to the engine 320 of the camera application 300, causes the processor 212 to implement, on the electronic device 110, the interface(s) and/or capturing contents of the individual camera mode or camera function of the camera package.

For example, according to at least some example embodiments, the camera application 300 includes program code corresponding to a plurality of camera functions (e.g., camera functions of the mini cameras 310) and program code corresponding to a common engine (e.g., engine 320). Further, the plurality of camera functions may each configured in a package form to implement an individual camera mode of the camera application 300, and the common engine may be configured to implement rendering and layout functions of the camera application 300 with respect to the individual camera modes of each of the plurality of camera functions. Additionally, the camera application 300 may further include program code for receiving a user selection corresponding to a camera function from among a plurality of camera functions included in a camera list (e.g., mini camera list 711 discussed in greater detail below with reference to FIG. 7), and program code for constructing a user interface for image capturing using a package of the camera function corresponding to the user selection.

Operations described in the present application as being performed by an application (e.g., the camera application 300), or an element thereof (e.g., mini cameras 310, engine 320, and/or a camera function of the camera application 300), may be performed by a processor (e.g., processor 212) executing computer-executable code (e.g., program code of the camera application 300) that is stored in memory (e.g., memory 211) and includes instructions for causing the processor to carry out and/or control the operations described in the present disclosure as being performed by the application or element thereof.

Figure 4:
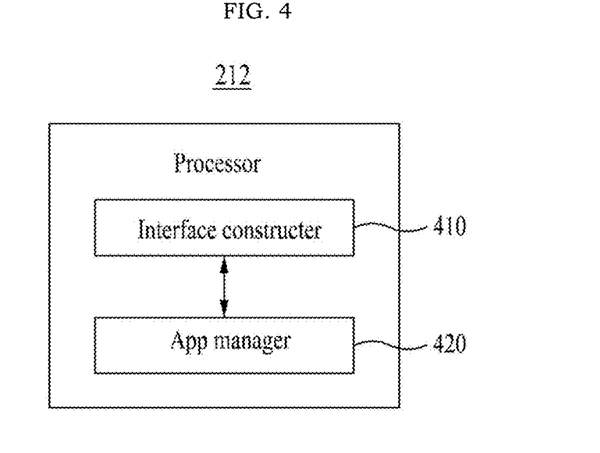
FIG. 4 illustrates an example of a component includable in a processor of an electronic device according to at least one example embodiment.
Figure 5:
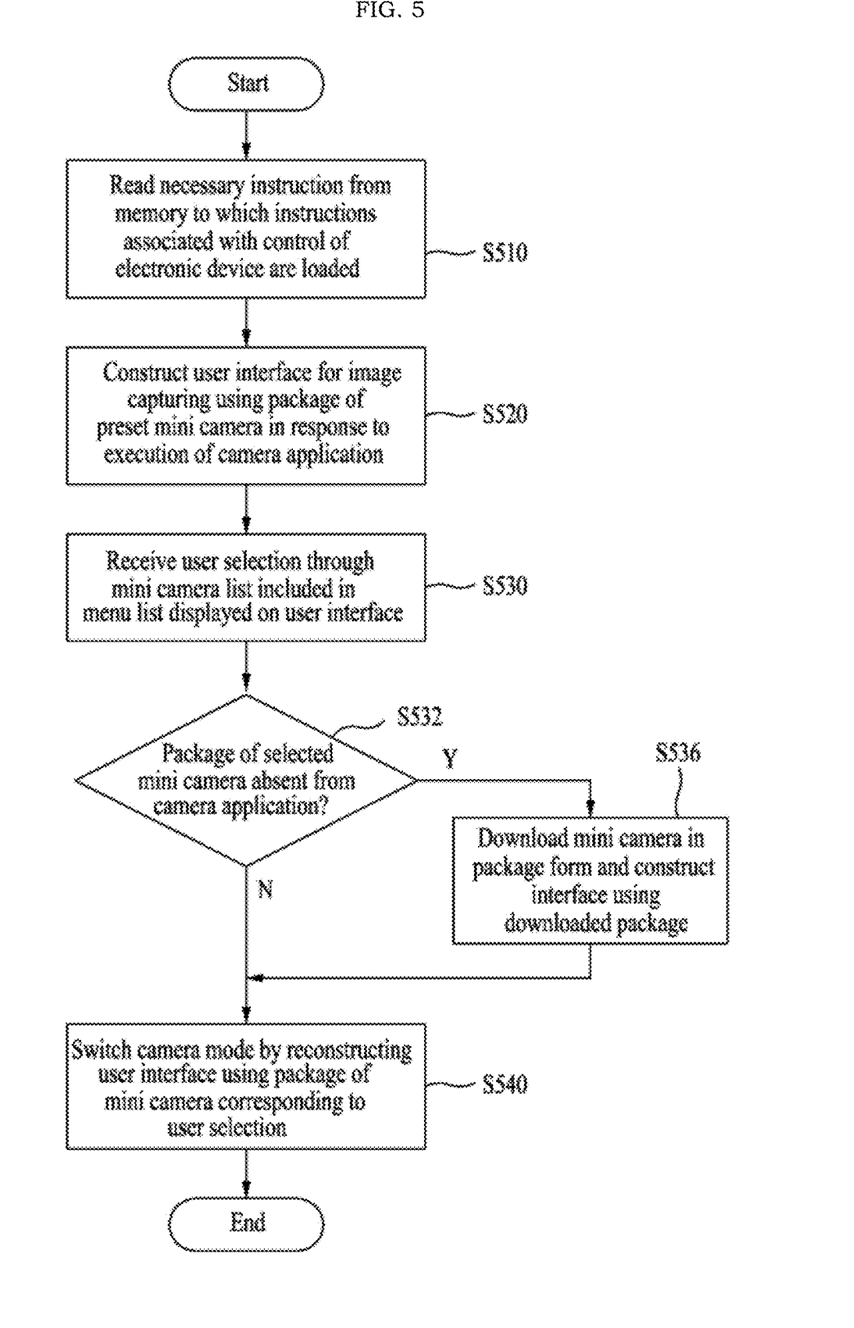
FIG. 5 is a flowchart illustrating an example of a method performed by an electronic device according to at least one example embodiment.

FIG. 4 illustrates an example of a component includable in a processor of an electronic device according to at least one example embodiment, and FIG. 5 is a flowchart illustrating an example of a method performed by an electronic device according to at least one example embodiment.

A camera system implemented as a computer may be configured in the electronic device 110 according to the example embodiment. For example, the camera system may be configured in an independently operating program form, or may be configured in an in-app form of a specific application to be operable on the specific application.

Depending on example embodiments, the camera system may provide a camera function through interaction with the server 150.

The camera system configured in the electronic device 110 may perform a camera function control method of FIG. 5 in response to an instruction provided from the camera application 300 installed on the electronic device 110. To perform the camera function control method of FIG. 5, the processor 212 of the electronic device 110 may include an interface constructor 410 and an app manager 420 shown in FIG. 4 as components. Depending on example embodiments, the components of the processor 212 may be selectively included in or excluded from the processor 212. Also, the components of the processor 212 may be separate or merged for functional representation of the processor 212.

The processor 212 and the components of the processor 212 may control the electronic device 110 to perform operations S510 to S540 included in the camera function control method of FIG. 5. For example, the processor 212 and the components of the processor 212 may be configured to execute an instruction according to a code of at least one program and a code of an OS included in the memory 211.

Here, the components of the processor 212 may be representations of different functions of the processor 212 that are performed by the processor 212 in response to instructions, for example, instructions provided from the application executed on the electronic device 110, provided from a program code stored on the electronic device 110. For example, any or all operations described in the present disclosure as being performed by the interface constructor 410 or the app manager 420 may be performed by the processor 212 reading one or more program instructions corresponding to the operation from storage (e.g., memory 211), and executing the read one or more program instructions. For example, the interface constructor 410 may be used as a functional representation of the processor 212 to control the electronic device 110 to construct a user interface for image capturing.

Referring to FIG. 5, in operation S510, the processor 212 may read a necessary instruction from the memory 211 to which instructions associated with control of the electronic device 110 are loaded. In this case, the read instruction may include an instruction for controlling the processor 212 to perform the following operations S520 to S540.

In operation S520, the interface constructor 410 may construct a user interface for image capturing using a package of a preset mini camera in response to execution of the camera application 300. An image capturing screen may be constructed such that a capturing interface included in the mini camera is overlapped on a camera image of the electronic device 110. For example, when a separate initial screen, such as a home screen, is provided in response to execution of the camera application 300 and a user selects a specific mini camera through a menu displayed on the initial screen, a user interface of the selected specific mini camera may be constructed and provided. As another example, in response to execution of the camera application 300, a user interface for image capturing may be immediately constructed and provided. Here, a user interface of a mini camera set as a basic function or a user interface of a mini camera recently used by the user of the electronic device 110 may be preferentially provided among mini cameras included in the camera application 300. In the case of the basic function, a default camera function may be designated to a main mini camera. Alternatively, a mini camera frequently used by the user may be designated as the basic function through user settings.

In operation S530, the interface constructor 410 may receive a user selection for switching a camera mode through a mini camera list included in a menu list displayed on the user interface provided from the camera application 300. An interface for selecting a mini camera may be included in the menu list of the camera application 300 and thereby provided. The mini camera list may be provided through the menu list of the user interface of the mini camera currently being executed. Alternatively, a user selectable mini camera list may be provided through a separate page, such as a home screen provided from the camera application 300. To switch a camera mode, the user may select a desired mini camera from the mini camera list included in the menu list of the camera application 300.

In operation S540, the interface constructor 410 may switch a camera mode by reconstructing the user interface for image capturing using a package of the mini camera corresponding to the user selection. Switching between mini cameras may be performed by configuring each mini camera in a package form within the camera application 300 and by changing a mode instead of calling and executing another application. A mini camera may be applied as a camera mode through a screen configuration using a package corresponding to a user selection through a menu, which is similar to selecting a filter or an effect to be applied to a camera image within the camera application 300. By changing a camera mode in response to a selection on a mini camera, a corresponding function may be executed using a runtime script. Interfaces included in a camera mode may be dynamically configured based on a mini camera in execution by configuring a capturing interface included in a package of the selected mini camera to be overlapped on a camera image. That is, switching to a different type of a camera mode may be immediately performed through a simple selection using a menu list within the camera application 300, instead of executing a mini camera in an individual app form. Accordingly, it is possible to dynamically switch between camera modes within a single app.

All of packages of mini cameras may be included in advance in the camera application 300. As another example, a package of a mini camera may be downloaded in real time at a point in time selected by the user.

When the package of the mini camera selected by the user from the mini camera list is absent within the camera application 300, the app manager 420 may download the package in real time at a point in time selected by the user through the server 150 associated with the camera application 300. Once the package of the mini camera selected by the user is downloaded, the interface constructor 410 may construct a user interface of the corresponding camera mode using the downloaded package.

Once the package of the mini camera is downloaded, the app manager 420 may maintain the downloaded package on a client, for example, the camera application 300 installed on the electronic device 110, and may automatically update a package of each mini camera in response to updating the camera application 300.

Thus, according to at least some example embodiments, the camera function control method includes receiving a user selection corresponding to a camera function selected from a camera list which includes a plurality of camera functions (e.g., the camera functions of a mini cameras 310) of a camera application (e.g., camera application 300) installed on a electronic device (e.g., electronic device 110); and constructing, using a package of the camera function corresponding to the user selection, a user interface for image capturing. Further, according to at least some example embodiments, the plurality of camera functions may each be configured in a package form to be operable in an individual camera mode of the camera application.

Figure 6:
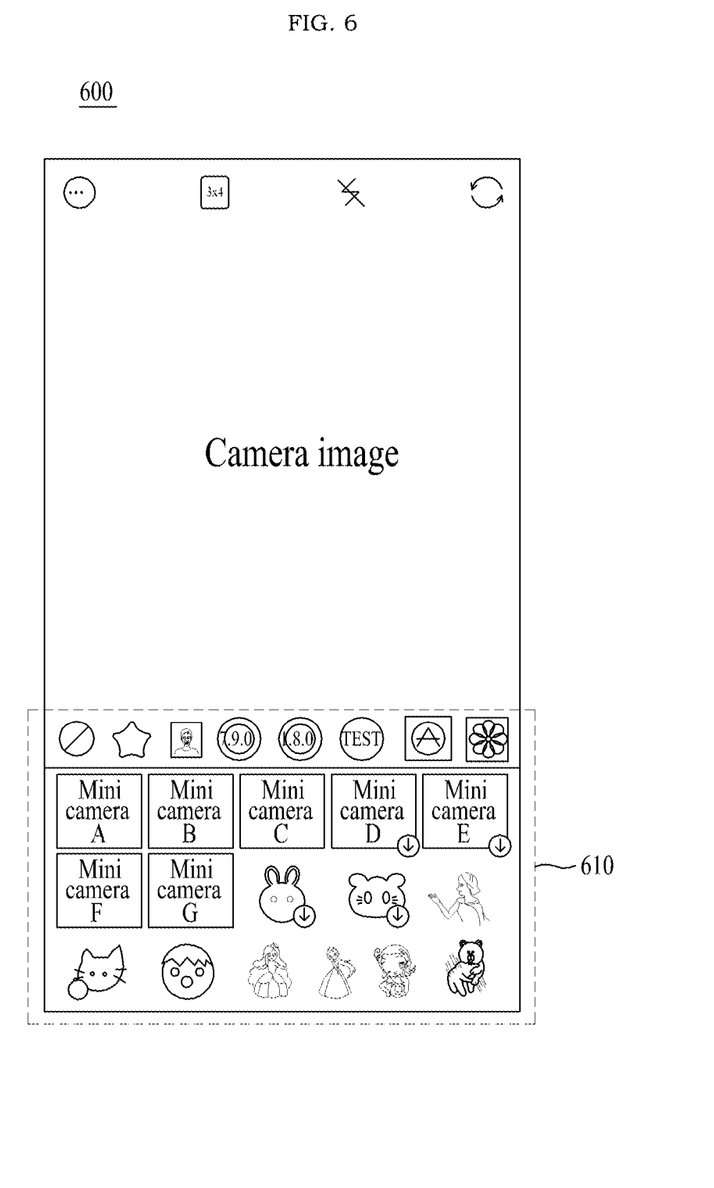
FIGS. 6 and 7 illustrate examples of a user interface of a mini camera according to at least one example embodiment.
Figure 7:
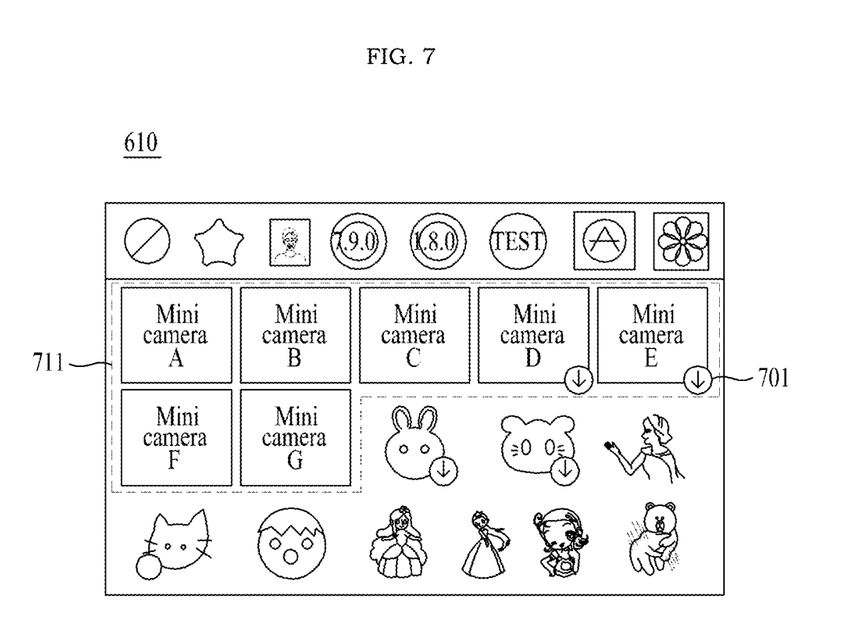

FIGS. 6 and 7 illustrate examples of a user interface of a mini camera according to at least one example embodiment.

FIG. 6 illustrates an image capturing screen 600 of a default camera function (referred as a mini camera X) of the camera application 300.

The image capturing screen 600 may include a capturing interface and capturing content corresponding to a concept of the mini camera X only. A menu list 610 associated with image capturing may be included in the image capturing screen 600 of the mini camera X.

The menu list 610 may include, as functions associated with image capturing, a photo taking button, a video recording button, a video fast-forward setting button, a front/rear camera switching button, a flash ON/OFF button, a screen ratio switching button, a collage setting button, an album open button, a timer setting button, a mode (e.g., a night mode, a high definition mode) setting button, a music add button, a filter/effect (e.g., a beauty effect) selection button, an AR content (e.g., animal sticker, invert sticker, facial recognition sticker, and draw sticker) selection button, and the like.

The menu list 610 may configure all of functions included in the camera application 300 as a menu within a mini camera. Referring to FIG. 6, the menu list 610 may be included at a lower end of the image capturing screen 600. Also, the menu list 610 may be included at any desired layout, such as an upper end or a side of the image capturing screen 600.

Referring to FIG. 7, the menu list 610 may basically include a list of contents applicable to a camera image. In particular, a mini camera list 711 may be included as an interface for selecting a mini camera. The mini camera list 711 may include any type of mini cameras providable as each corresponding camera mode in the camera application 300.

At least a portion of the mini cameras included in the mini camera list 711 may be configured by including a corresponding camera package in the camera application 300 in advance. The remaining mini camera or cameras may be configured to be downloaded in real time at a point in time selected by the user.

A mini camera of which a camera package is not downloaded among the mini cameras included in the mini camera list 711 may be displayed to be distinguished from other mini cameras. For example, a download button 701 may be included. In response to selecting a mini camera that includes the download button 701 from the mini camera list 711, a package of the corresponding mini camera may be downloaded in real time at a selection point in time.

Figure 8:
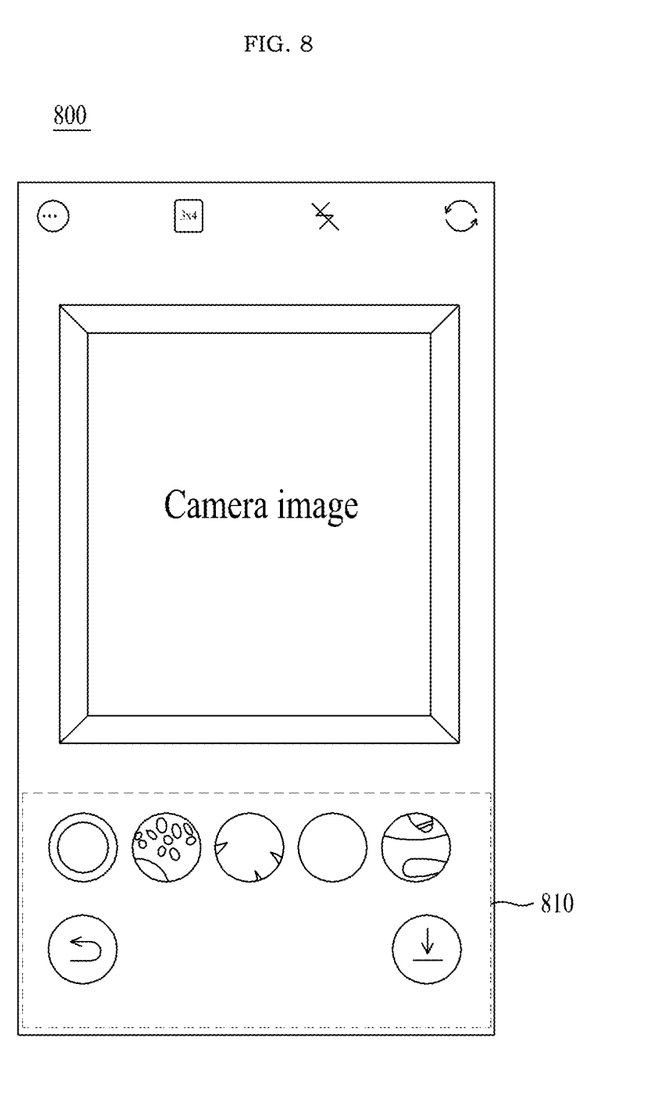
FIG. 8 illustrates an example of switching between mini cameras according to at least one example embodiment.

FIG. 8 illustrates an example of switching between mini cameras according to at least one example embodiment.

FIG. 8 illustrates an image capturing screen 800 of a mini camera B among mini cameras included in the camera application 300.

Referring to FIG. 8, in response to selecting the mini camera B from the mini camera list 711 in a state in which a mini camera X is executed, the image capturing screen 800 may be configured through a package of the selected mini camera B.

Instead of executing the mini camera B in an individual app form, switching to the mini camera B may be performed while using the mini camera X within the camera application 300 that is a single application.

The image capturing screen 800 may include a capturing interface and capturing content corresponding to a concept of the mini camera B. When the user selects the mini camera B from the mini camera list 711, the user may switch to the capturing interface of the selected mini camera B. When switching to the selected mini camera B is completed, functions and contents available in a corresponding camera mode as well as the capturing interface and may be changed based on the package of the mini camera B.

The image capturing screen 800 of the mini camera B may include a menu list 810 associated with image capturing in at least portion of a layout. Here, the image capturing screen 800 may be configured such that the menu list 810 may directly include a mini camera list (not shown) for selecting a mini camera. Alternatively, a separate menu for directing to an interface that provides a mini camera list (not shown) may be included.

Accordingly, each mini camera may be configured in a package form to be operable in an individual camera mode within a single app. Also, a different type of a camera mode may be immediately executed in response to a simple selection using a menu.

According to some example embodiments, it is possible to use various camera modes in a single app through a camera application including a plurality of camera packages, and to provide a light camera application in which the plurality of camera packages uses a common engine.

The systems and or apparatuses described herein may be implemented using hardware components, software components, and/or a combination thereof. For example, a processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer record medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable record mediums.

The methods according to the example embodiments may be recorded in non-transitory computer-readable record media including program instructions to implement various operations embodied by a computer. The media may also include, alone or in combination with the program instructions, data files, data structures, and the like. The media and program instructions may be those specially designed and constructed for the purposes, or they may be of the kind well-known and available to those having skill in the computer software arts. Examples of non-transitory computer-readable record media include magnetic media such as hard disks, floppy disks, and magnetic tape; optical media such as CD ROM disks and DVD; magneto-optical media such as floptical disks; and hardware devices that are specially to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments, or vice versa.

Example embodiments of the inventive concepts having thus been described, it will be obvious that the same may be varied in many ways. Such variations are not to be regarded as a departure from the intended spirit and scope of example embodiments of the inventive concepts, and all such modifications as would be obvious to one skilled in the art are intended to be included within the scope of the following claims.

What is claimed is:

1. A computer-implemented camera function control method of an electronic device, the camera function control method comprising:
    receiving a user selection, the user selection corresponding to a camera function selected from a camera list which includes a plurality of camera functions of a camera application installed on the electronic device,
    the plurality of camera functions each being configured in a package form to be operable in an individual camera mode of the camera application; and
    constructing, using a package of the camera function corresponding to the user selection, a user interface for image capturing,
    wherein, each camera function from among the plurality of camera functions of the camera application includes one or more user interfaces, and
    wherein, for each package of each camera function from among the plurality of camera functions of the camera application, the package includes image and location information for each user interface from among the one or more user interfaces included in the camera function and function metadata for each user interface from among the one or more user interfaces included in of the camera function.

2. The camera function control method of claim 1, wherein the plurality of camera functions use a common engine in the camera application for rendering and layout.

3. The camera function control method of claim 1, wherein each of the plurality of camera functions included in the camera application are configured in a package form including a capturing interface configurable in an individual camera mode.

4. The camera function control method of claim 1, further comprising:
    providing the camera list by including the camera list in a menu list of an image capturing related function as content included in the camera application.

5. The camera function control method of claim 1, wherein the constructing comprises constructing the user interface such that a capturing interface included in the package of the camera function corresponding to the user selection is overlapped on a camera image.

6. The camera function control method of claim 1, wherein the constructing includes switching between camera functions such that a camera mode is changed in the camera application in response to the user selection.

7. The camera function control method of claim 1, wherein the constructing comprises including, in the user interface, a list of contents applicable to a camera image, the list of contents being included in the package of the camera function corresponding to the user selection.

8. The camera function control method of claim 1, further comprising:
    downloading in real time the package of the camera function corresponding to the user selection through a server associated with the camera application.

9. The camera function control method of claim 8, further comprising:
    automatically updating the downloaded package at a time of updating the camera application.

10. A non-transitory computer-readable record medium storing instructions that, when executed by a processor, cause the processor to perform the camera function control method of claim 1.

11. A file distribution system comprising:
    memory storing computer-executable instructions; and
    a processor configured to execute the computer-executable instructions such that the processor is configured to,
        transmit a file of a camera application to an electronic device in response to a request from the electronic device,
    wherein the camera application includes program code corresponding to a plurality of camera functions and program code corresponding to a common engine,
    wherein the plurality of camera functions are each configured in a package form to implement an individual camera mode of the camera application,
    wherein the common engine is configured to implement rendering and layout functions of the camera application with respect to the individual camera modes of each of the plurality of camera functions,
    wherein the camera application further includes,
        program code for receiving a user selection, the user selection corresponding to a camera function from among a plurality of camera functions included in a camera list, and
        program code for constructing a user interface for image capturing using a package of the camera function corresponding to the user selection,
    wherein, each camera function from among the plurality of camera functions of the camera application includes one or more user interfaces, and
    wherein, for each package of each camera function from among the plurality of camera functions of the camera application, the package includes image and location information for each user interface from among the one or more user interfaces included in the camera function and function metadata for each user interface from among the one or more user interfaces included in of the camera function.

12. A computer system comprising:
    a memory storing computer-executable instructions; and
    at least one processor configured to execute the computer-executable instructions,
    wherein a camera application comprising a plurality of camera functions each configured in a package form to be operable in an individual camera mode is installed in the computer system, and wherein the at least one processor is configured to execute the computer-executable instructions such that the at least one processor is configured to,
   receive a user selection, the user selection corresponding to a camera function from among a plurality of camera functions included in a camera list, and
   construct a user interface for image capturing using a package of the camera function corresponding to the user selection in response to receiving the user selection,
wherein, each camera function from among the plurality of camera functions of the camera application includes one or more user interfaces, and
wherein, for each package of each camera function from among the plurality of camera functions of the camera application, the package includes image and location information for each user interface from among the one or more user interfaces included in the camera function and function metadata for each user interface from among the one or more user interfaces included in of the camera function.

13. The computer system of claim 12, wherein the plurality of camera functions use a common engine in the camera application for rendering and layout.

14. The computer system of claim 12, wherein each of the plurality of camera functions included in the camera application are each configured in a package form including a capturing interface configurable in an individual camera mode.

15. The computer system of claim 12, wherein the at least one processor is further configured to execute the computer-executable instructions such that the at least one processor is configured to provide the camera list by including the camera list in a menu list of an image capturing related function as content included in the camera application.

16. The computer system of claim 12, wherein the at least one processor is further configured to execute the computer-executable instructions such that the at least one processor is configured to switch between camera functions such that a camera mode is changed in the camera application in response to the user selection.

17. The computer system of claim 12, wherein the at least one processor is further configured to execute the computer-executable instructions such that the at least one processor is configured to include, in the user interface, a list of contents applicable to a camera image,
   the list of contents being included in the package of the camera function corresponding to the user selection.

18. The computer system of claim 12, wherein the at least one processor is further configured to execute the computer-executable instructions such that the at least one processor is configured to download in real time the package of the camera function corresponding to the user selection through a server associated with the camera application.

19. The computer system of claim 18, wherein the at least one processor is further configured to execute the computer-executable instructions such that the at least one processor is configured to automatically update the downloaded package at a time of updating the camera application.

\* \* \* \* \*